United States Patent
Breuls et al.

[11] Patent Number: 5,320,660
[45] Date of Patent: Jun. 14, 1994

[54] METHOD OF MANUFACTURING AN OPTICAL FIBRE

[75] Inventors: Antonius H. E. Breuls; Andries H. Van Bergen; Henrikus L. M. Jansen, all of Eindhoven, Netherlands

[73] Assignee: U.S. Philips Corporation, Tarrytown, N.Y.

[21] Appl. No.: 937,616

[22] Filed: Aug. 28, 1992

[30] Foreign Application Priority Data

Sep. 3, 1991 [EP] European Pat. Off. ........ 91202238.1

[51] Int. Cl.$^5$ ............................................. C03B 37/023
[52] U.S. Cl. ........................................ 65/3.11; 65/2; 65/12; 65/13; 65/109
[58] Field of Search ................... 65/2, 3.11, 109, 13, 65/12

[56] References Cited

U.S. PATENT DOCUMENTS

| | | | |
|---|---|---|---|
| 4,578,101 | 3/1986 | Clark et al. | 65/109 |
| 5,000,771 | 3/1991 | Fleming et al. | 65/2 |
| 5,221,306 | 6/1993 | Fleming et al. | 65/2 |

FOREIGN PATENT DOCUMENTS

| | | |
|---|---|---|
| 0171103 | 2/1986 | European Pat. Off. |
| 3739189 | 6/1989 | Fed. Rep. of Germany |

OTHER PUBLICATIONS

"Characterization of the Preform Stretching Process" Journal of Lightwave Technology, vol. LT-5, No. 12, Dec. 1987.

Primary Examiner—Robert L. Lindsay

[57] ABSTRACT

An optical fibre is manufactured by stretching a rod-shaped initial preform, after which a cladding tube is melted on the initial preform and the final preform thus obtained is drawn into an optical fibre. A narrow and hot softening zone is used to stretch the initial preform, which softening zone is obtained, for example, by means of a plasma torch 2. By virtue thereof, the stretching process can be controlled in a rapid and simple manner.

4 Claims, 1 Drawing Sheet

METHOD OF MANUFACTURING AN OPTICAL FIBRE

BACKGROUND OF THE INVENTION

The invention relates to a method of manufacturing an optical fibre, in which method a rod-shaped initial preform having a core and a cladding surrounding this core is manufactured, the refractive index of the cladding being lower than that of the core, after which the initial preform is stretched by creating a softening zone in the initial preform, which softening zone is moved longitudinally along the initial preform, after which at least one cladding tube is melted on the initial preform and the final preform thus obtained is drawn into an optical fibre.

The term optical fibre is to be understood to mean a fibre of glass or quartz glass such as used for, for example, telecommunication purposes.

Such a method is described in U.S. Pat. No. 4,578,101, in which an initial preform is used which is manufactured by the vapour phase axial deposition (VAD) method. However, the method according to the invention can also be applied using initial preforms which are manufactured by different methods which are known per se, for example by a method in which a tube is internally clad by means of chemical deposition from the vapour phase (CVD or MCVD) or by plasma-activated chemical deposition from the vapour phase (PCVD) after which the tube is collapsed to manufacture a solid initial preform. According to said United States Patent, a hydrogen-oxygen torch or a heating furnace is used to create a softening zone in the initial preform while the initial preform is being stretched. The stretching process and the control thereof are further described by D. H. Smithgall and R. E. Frazee in Journal of Lightwave Technology, LT-5 (12), on pages 1755-1762 (1987).

A disadvantage of the known method is that it is slow and it requires the temperature and the velocities to be accurately adjusted. The hydrogen-oxygen flame is comparatively wide and produces a softening zone having a length of 10 to 12 cm. The temperature in the softening zone generally ranges from 1800° C. to 2000° C. and may reach 2200° C. A narrower and hotter flame cannot suitably be used due to the occurrence of burn-off losses caused by convective, turbulent gas streams around the softening zone. This leads to loss of material and may result in an irregularly shaped initial preform.

SUMMARY OF THE INVENTION

It is an object of the invention to provide, inter alia, a rapid and effective method of stretching an initial preform. In this connection, a further object of the invention is aimed at providing a method in which burn-off losses are minimized and in which the initial preform remains regularly shaped. It is an object of the invention to provide a method in which complicated controls for the temperature and the displacement velocities of the energy-supply device and the initial preform can be dispensed with.

These objects are achieved by a method as described in the opening paragraph, which method is characterized according to the invention in that to stretch the initial preform a narrow and hot softening zone is used whose dimension in the longitudinal direction of the initial preform is less than 5 cm and in which the highest temperature is at least 2300° C., and in that to obtain the softening zone an energy-supply device is used which causes no or almost no convective gas stream at the location of the initial preform. Preferably, the dimension of the softening zone in the longitudinal direction of the initial preform is less than 3 cm and the highest temperature in the softening zone is at least 2400° C. The highest temperature in the softening zone is the temperature of the glass surface.

According to a preferred embodiment of the method in accordance with the invention, a plasma torch is used as the energy-supply device.

According to an alternative embodiment of the method in accordance with the invention, a laser light source is used as the energy-supply device.

In European Patent Specification EP 171103, a description is given of a device and a method of collapsing a quartz tube into a preform, in which method a plasma torch is used as the energy-supply device. In German Patent Application DE 3739189, a description is given of a method of collapsing a quartz tube into a preform, in which method the tube is preheated to a temperature of approximately 1600° C., after which a narrow zone is heated to a temperature of approximately 2000° C. by means of an additional energy-supply device consisting, according to said German Patent Application, of UV-lamps or a laser light source. Both publications describe only the collapsing of a preform for the manufacture of an optical fibre and no mention is made of stretching an initial preform and melting-on a cladding tube. Therefore, the problem to be solved according to the invention is not mentioned in said publications.

BRIEF DESCRIPTION OF THE DRAWINGS

The invention will be explained in greater detail by means of an exemplary embodiment and with reference to an accompanying drawing, in which FIG. 1 diagrammatically shows the stretching of the initial preform in the method according to the invention, and FIG. 2 diagrammatically shows a softening zone in the initial preform.

DESCRIPTION OF THE PREFERRED EMBODIMENTS

Exemplary Embodiment

An initial preform was manufactured according to the PCVD method which is known per se, said initial preform comprising a core and a cladding surrounding said core, the refractive index of the cladding being lower than that of the core as a result of suitably doping the quartz glass used for the core and/or the cladding. If desired, it is alternatively possible to use other methods which are known per se such as MCVD (modified chemical vapour deposition), OVD (outside vapour deposition) and VAD (vapour phase axial deposition) for the manufacture of the initial preform.

Figure 1:
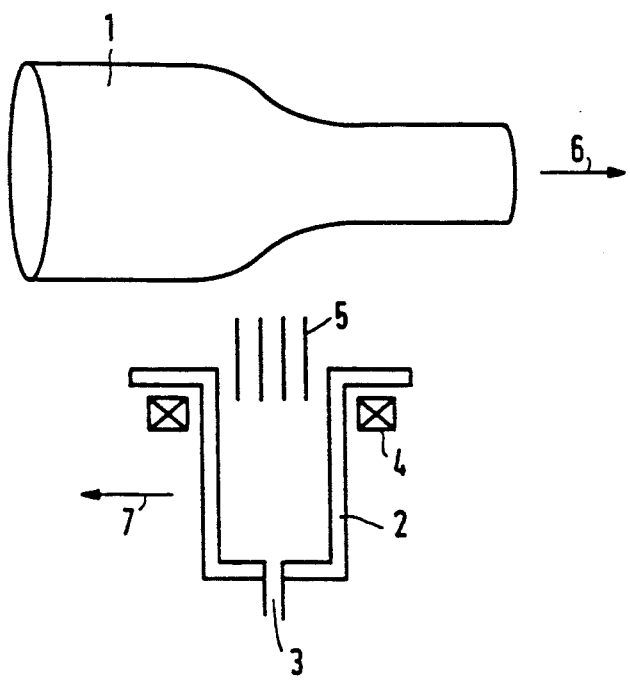

The initial preform was stretched to obtain a preform having a greater length and a smaller core diameter, see for example U.S. Pat. No. 4,578,101. FIG. 1 diagrammatically shows the stretching of the initial preform 1 by using a plasma torch 2 of quartz glass. The plasma torch 2 comprises a gas supply 3 for supplying, for example, a mixture of argon and air. Around the plasma torch 2 there is provided a coil 4 which is connected to a HF generator which is not shown in the Figure. The plasma formed is moved towards the initial preform by means of a laminar gas stream 5. The initial preform 1 was stretched by subjecting it to a pulling force in the direction of arrow 6, while the plasma torch was moved in the direction of arrow 7, causing the softening zone to shift. If desired, the initial preform can be rotated about the longitudinal axis during the stretching operation. The method of stretching an initial preform is described in greater detail in the above-mentioned publication by D. H. Smithgall and R. E. Frazee. A suitable plasma torch and a method of using such a torch are described in European Patent Specification EP 171103. In an alternative embodiment of the method, a laser light source can alternatively be used as the energy-supply device to obtain a narrow and hot softening zone.

Following the stretching of the initial preform, one or more cladding tubes are melted-on to give the cladding the required thickness. For this purpose, in general, quartz glass is used of a lower grade than the quartz glass used for the core and the portion of the cladding directly surrounding the core. Subsequently, the final preform thus obtained is drawn into an optical fibre according to a method which is known per se, which fibre may then be clad with a protective coating of metal or synthetic resin according to a method which is also known per se.

Figure 2:
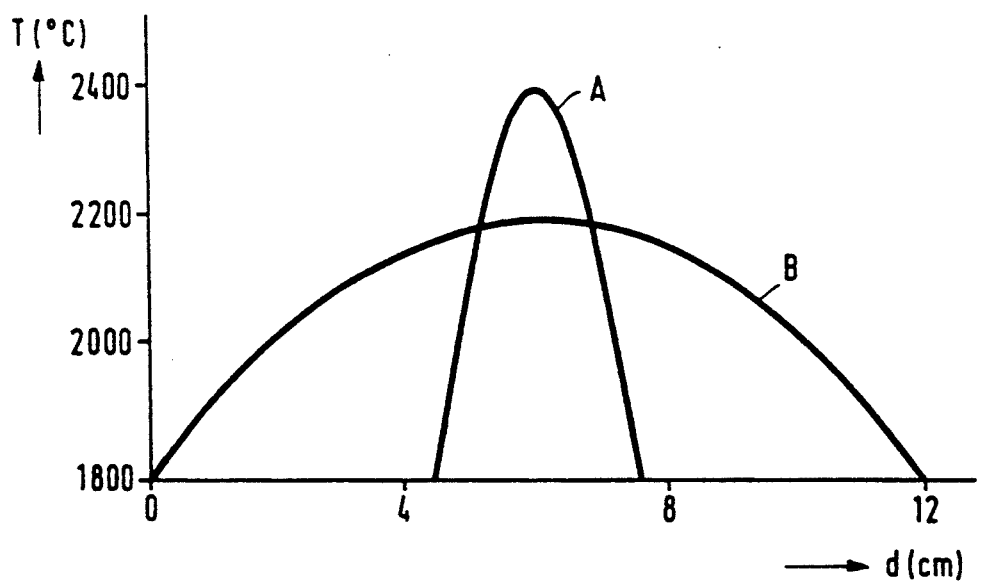

FIG. 2 shows the temperature variation T in ° C. as a function of the distance d in the longitudinal direction of the initial preform, at the location of the softening zone, for the method according to the invention (A) and for the method according to the present state of the art (B), respectively. The dimension of the softening zone largely corresponds to the area in which the temperature is higher than approximately 1800° C. and, according to the invention, said dimension is less than 5 cm, i.e. approximately 3 cm in the exemplary embodiment. In the method according to the present state of the art, the dimension of the softening zone is 10 to 12 cm. In the method according to the invention, the highest temperature in the softening zone exceeds 2300° C., i.e. approximately 2400° C. according to the exemplary embodiment. In the method according to the present state of the art, the highest temperature is below 2200° C., in general between 1800° C. and 2000° C. The use of a narrow hot zone provides sufficient energy to bring about the required softening and deformation during the stretching of the initial preform, but it precludes the occurrence of undesired side effects before and after the actual stretching phase. By virtue thereof, corrections and laborious control measures are superfluous. In the method according to the present state of the art, the most important problem is that during the long, required processing time both the temperature and the displacement velocities of the initial preform (on the side where a pulling force is exerted) and the plasma torch must be very accurately controlled. The method according to the invention overcomes said disadvantages by using a narrower and, hence, better defined softening zone and by a higher speed of the entire process.

We claim:

1. In a method of manufacturing an optical fiber, in which method a rod-shaped initial preform having a core and a cladding surrounding this core is manufactured, the refractive index of the cladding being lower than that of the core, said method comprising stretching the initial preform by creating a softening zone in the initial preform, moving the softening zone longitudinally along the initial preform, melting at least one cladding tube on the initial preform and drawing the final preform into an optical fiber, wherein the improvement comprises that in stretching the initial preform a narrow and hot softening zone is used whose dimension in the longitudinal direction of the initial preform is less than 5 cm and in which the maximum temperature is at least 2300° C., and in that to obtain the softening zone an energy-supply device is used which causes no or almost no convective gas stream at the location of the initial preform.

2. A method as claimed in claim 1, in which the dimension of the softening zone in the longitudinal direction of the initial preform is less than 3 cm and in which the highest temperature in the softening zone is at least 2400° C.

3. A method as claimed in claim 2, characterized in that a plasma torch is used as the energy-supply device.

4. A method as claimed in claim 2, characterized in that a laser light source is used as the energy-supply device.

* * * * *